United States Patent [19]

Komuro et al.

[11] Patent Number: 5,214,764
[45] Date of Patent: May 25, 1993

[54] DATA PROCESSING APPARATUS FOR OPERATING ON VARIABLE-LENGTH DATA DELIMITED BY DELIMITER CODES

[75] Inventors: Junichi Komuro; Makoto Kimura, both of Tokyo, Japan

[73] Assignee: Casio Computer Co., Ltd., Tokyo, Japan

[21] Appl. No.: 844,994

[22] Filed: Mar. 2, 1992

Related U.S. Application Data

[63] Continuation of Ser. No. 360,226, Jun. 1, 1989, abandoned.

[30] Foreign Application Priority Data

Jul. 15, 1988 [JP] Japan .................. 63-175112

[51] Int. Cl.⁵ .................................. G06F 12/04
[52] U.S. Cl. .................. 395/425; 364/245.1; 364/970.3
[58] Field of Search ............ 364/DIG. 1, DIG. 4; 395/425

[56] References Cited

U.S. PATENT DOCUMENTS

| | | | |
|---|---|---|---|
| 3,822,378 | 7/1974 | Kashio | 364/779 |
| 4,003,031 | 1/1977 | Kashio | 395/600 |
| 4,031,515 | 6/1977 | Kashio | 341/87 |
| 4,032,900 | 6/1977 | Kashio | 395/250 |
| 4,034,350 | 7/1977 | Kashio | 395/200 |
| 4,064,553 | 12/1977 | Kashio | 395/425 |
| 4,079,234 | 3/1978 | Kashio | 377/26 |
| 4,103,334 | 7/1978 | Kashio | 395/425 |
| 4,133,041 | 1/1979 | Kashio | 395/425 |
| 4,145,753 | 3/1979 | Kashio | 395/425 |
| 4,376,933 | 3/1983 | Saran et al. | 364/900 |
| 4,542,453 | 9/1985 | Patrick | 364/200 |
| 4,771,391 | 9/1988 | Blasbalg | 364/200 |
| 4,860,191 | 8/1989 | Nomura et al. | 364/200 |
| 4,875,160 | 10/1989 | Brown | 364/200 |

FOREIGN PATENT DOCUMENTS

| | | |
|---|---|---|
| 53-46689 | 12/1978 | Japan . |
| 57-51137 | 10/1982 | Japan . |
| 57-56093 | 11/1982 | Japan . |
| 58-46735 | 10/1983 | Japan . |
| 58-53384 | 11/1983 | Japan . |

*Primary Examiner*—David Y. Eng
*Attorney, Agent, or Firm*—Frishauf, Holtz, Goodman & Woodward

[57] ABSTRACT

When a start signal is supplied from a processing unit, a variable-length processing unit reads out variable-length data stored in a memory unit, executes an operation instructed by instruction information stored in an instruction memory, and outputs an operation end signal to the processing unit when the operation is ended. When the processing unit receives the operation end signal, it outputs an operation result obtained by the variable-length processing means to other devices.

8 Claims, 4 Drawing Sheets

DATA PROCESSING APPARATUS FOR OPERATING ON VARIABLE-LENGTH DATA DELIMITED BY DELIMITER CODES

This application is a continuation of application Ser. No. 07/360,266, filed Jun. 1, 1989, now abandoned.

BACKGROUND OF THE INVENTION

1. Field of the Invention

The present invention relates to a data processing apparatus comprising a processing unit for fixed-length data processing and a processing unit for variable-length data processing.

2. Description of the Related Art

Most conventional CPUs are based on fixed-length data processing. Therefore, fixed-length data is processed by such a CPU, and various peripheral units are controlled by fixed-length data.

In such processing performed by fixed-length data, however, since calculation and transfer are executed by data having a fixed number of bytes, unnecessary digits must be processed. For this reason, a processing speed is low, and an operation efficiency of a memory used in the processing is reduced.

Therefore, a system is conventionally proposed to use a CPU capable of processing variable-length data by a software-like means using programs, thereby increasing the processing speed and memory efficiency. If variable-length data is processed by such a means, however, a load applied on the software is undesirably increased very much.

In the conventional apparatuses, therefore, when only fixed-length data is used, a processing speed is lowered, and an operation efficiency of a memory used in processing is reduced. If a CPU capable of processing variable-length data by a software-like means using programs is used, a load applied on the software is increased.

SUMMARY OF THE INVENTION

It is an object of the present invention to provide a data processing apparatus in which a processing unit for controlling devices controlled by fixed-length data and a processing unit for processing file data consisting of variable-length data suitable for high-speed processing are included independently of each other, thereby increasing a processing speed and a memory efficiency, and decreasing a load applied on a software.

The present invention includes various aspects, some of which are summarized below.

According to a first aspect of the present invention, a data processing apparatus comprises data storage means for storing variable-length data delimited by a delimiter code, variable-length processing means, including an instruction memory, an arithmetic unit, and control means for executing by the arithmetic unit an operation instructed by instruction information stored in the instruction memory on variable-length data read out from the data storage means, and for outputting by the control means an operation end signal after the operation is end, and processing means for outputting an operation start signal for starting the operation to the variable-length processing means, and supplying the executed result data to a peripheral unit after receiving the operation end signal from the variable-length processing means.

Other aspects of the present invention described in the present specification are included within the scope of the invention.

DETAILED DESCRIPTION OF THE PREFERRED EMBODIMENT

A preferred embodiment of the present invention will be described below with reference to the accompanying drawings.

Figure 1:
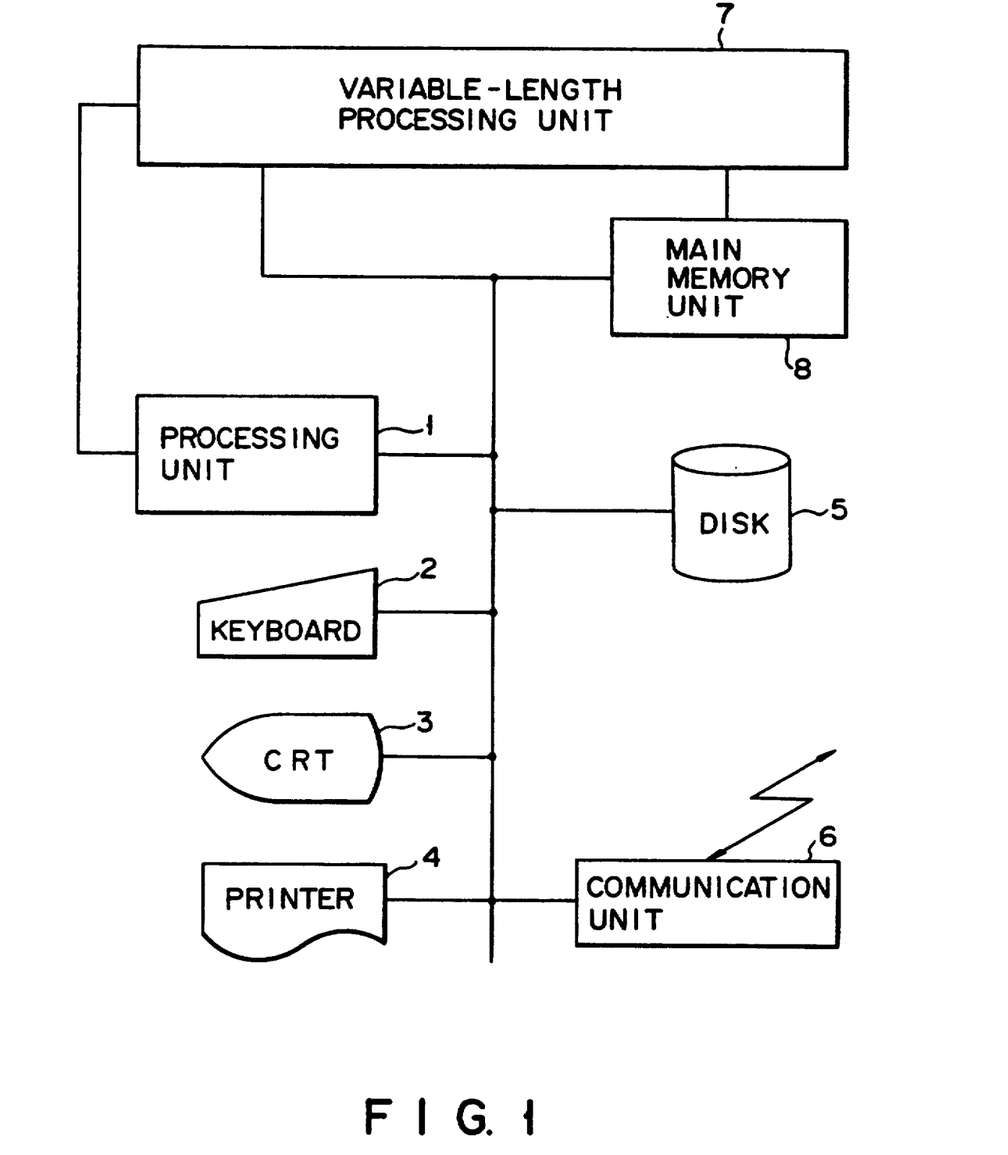
FIG. 1 is a block diagram showing an overall arrangement of an embodiment of the present invention.

FIG. 1 is a view showing an overall arrangement of an embodiment of the present invention. Referring to FIG. 1, reference numeral 1 denotes a processing unit comprising a general-purpose CPU based on fixed-length data processing. The processing unit 1 controls various peripheral units controlled by fixed-length data, i.e., in this embodiment, a keyboard 2, a CRT 3, a printer 4, a disk 5 and a communication unit 6. The processing unit 1 sets instruction information for a variable-length processing unit 7, outputs an operation start signal for starting an operation thereto, and receives an operation end signal therefrom. The variable-length processing unit 7 reads out variable-length data from a main memory unit 8 and executes operations such as addition/subtraction, code comparison and data transfer. After the variable-length processing unit 7 writes an operation result data in the main memory unit 8, it sends the operation end signal back to the processing unit 1.

Figure 2:
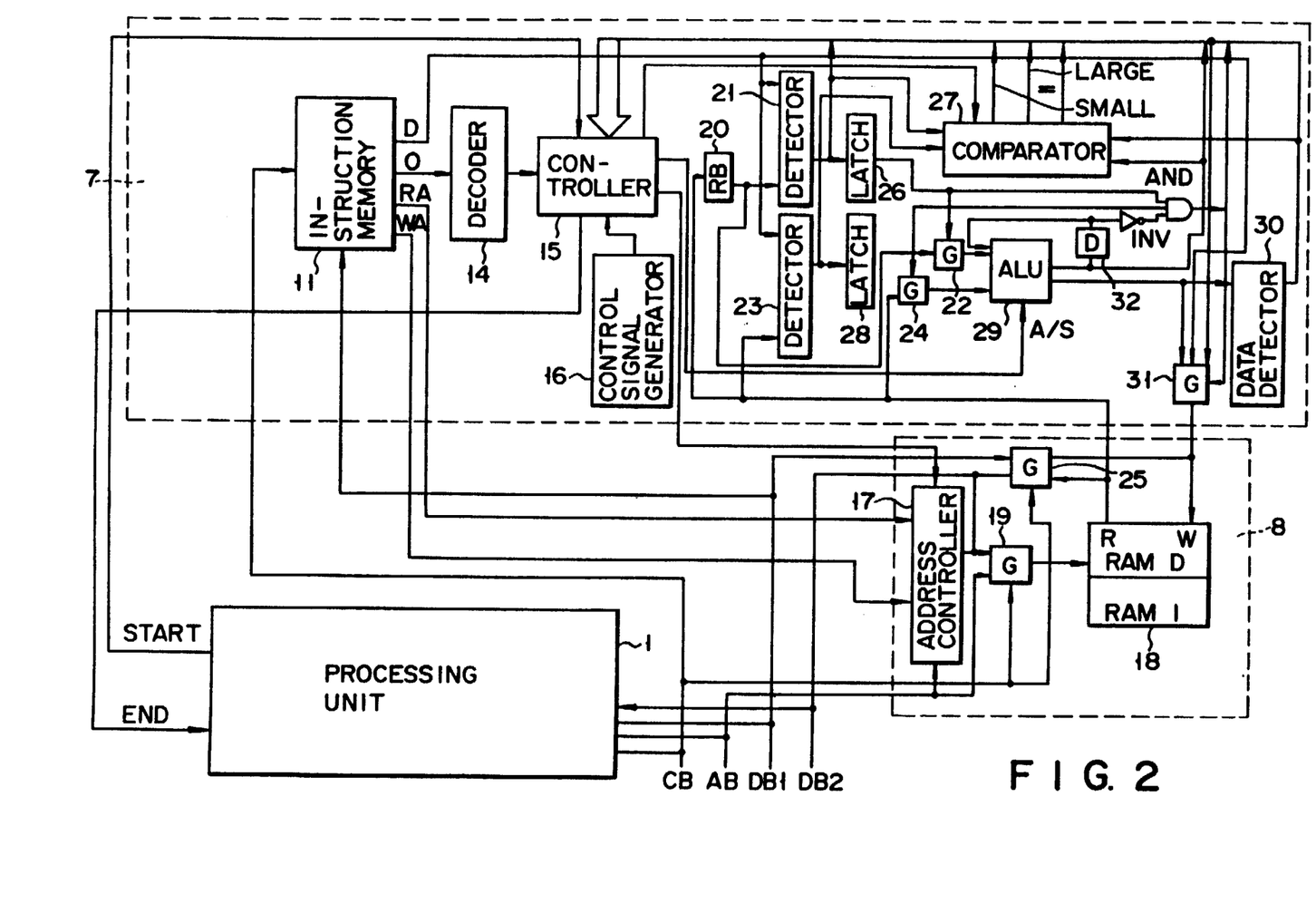
FIG. 2 is a block diagram showing a circuit arrangement of the embodiment.

FIG. 2 is a view showing in detail circuit arrangements of the variable-length processing unit 7 and the main memory unit 8 connected to the processing unit 1. In this case, the variable-length processing unit 7 includes an instruction memory 11. The main memory unit 8 includes a RAM 18 for storing data. The RAM 18 comprises an area I for storing instruction information and an area D for storing variable-length data. The instruction memory 11 stores instruction information for executing a variety of operations which are set by the processing unit 1. That is, the processing unit 1 supplies a gate switching signal to gate circuits 19 and 25 via a control bus CB, and reads out an instruction information, which is stored at an address in the area I of the RAM 18 supplied by the unit 1 via an address bus AB, via the gate circuit 25 and a data bus DB2. When a write signal is output from processor unit 1 to instruction memory 11 through the control bus CB, data of the readout instruction information is written in the instruction memory 11 via a data bus DB1. The instruction information consists of an operation code O for commanding processing execution, a read address RA and write address WA as data concerning an address, and a delimiter D representing a delimiter code for delimiting code array data. As the delimiter D, a track delimiter code "☒", a file delimiter code "§", a record delimiter code "(" and a word delimiter code "," are used.

The operation code O from the instruction memory 11 is supplied to a controller 15 via a decoder 14. The controller 15 controls various control processing corresponding to the operation code O. The controller 15 supplies an operation end signal to the processing unit 1. In this case, a control signal generator 16 supplies a control signal required for control to the controller 15.

The read and write addresses RA and WA in each instruction information in the instruction memory 11 are supplied to an address controller 17 of the main memory unit 8. The address controller 17 generates an address of the RAM 18 on the basis of the read and write addresses RA and WA, thereby controlling data read/write of the RAM 18 via the gate circuit 19. The address controller 17 receives a control signal from the controller 15 and updates an address of the RAM 18 by this control signal. The address controller 17 sends the last address of written data to the processing unit 1 via the data bus DB2.

Figure 3:
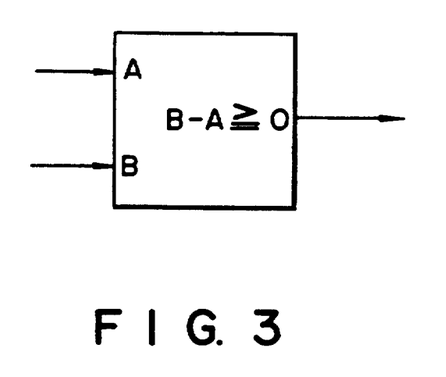
FIG. 3 is a view showing a detector used in the embodiment.

Data stored in the area D of the RAM 18 is expressed by a hexadecimal number in units of codes. The RAM 18 stores variable-length data in which the number of codes constituting each word varies, and the data is read out from the area D of the RAM 18 in units of codes, i.e., four bits. Data initially read out from the area D of the RAM 18 is temporarily written in a read buffer 20 and then supplied to a detector 21 and a gate circuit 22, and subsequent data is directly supplied to a detector 23 and a gate circuit 24. As shown in FIG. 3, each of the detectors 21 and 23 has two input terminals A and B. Each detector receives readout data from the RAM 18 at the terminal B and receives the delimiter D in an instruction information from the instruction memory 11 at the terminal A. When the two inputs satisfy a relation of $B-A \geq 0$, each detector generates a logic signal, i.e., an "H" output. In the following description, "H" and "L" are defined as a high level signal and a low level signal, respectively.

An output from the detector 21 is supplied to the controller 15, a latch 26 and a comparator 27. An output from the detector 23 is supplied to a latch 28 and the comparator 27. An output from the latch 26 is supplied as a disable signal to the gate circuit 22 and an AND gate AND. An output from the latch 28 is supplied as a disable signal to the gate circuit 24 and the AND gate AND.

The readout data from the RAM 18 is supplied to an ALU (arithmetic logic unit) 29 via the gate circuits 22 and 24. The ALU 29 executes addition/subtraction in accordance with an addition/subtraction command A/S from the controller 15. An operation result data is supplied to a data detector 30 and a gate circuit 31. An "H" output corresponding to a borrow and a carry in the operation performed by the ALU 29 is supplied to a delay circuit 32, the controller 15 and the comparator 27. An output from the delay circuit 32 is supplied to the ALU 29 and the AND gate AND via an inverter INV. An output from the AND gate AND is supplied to the controller 15 and supplied as a selection command to the gate circuit 31.

When the output from the ALU 29 is not 0, the data detector 30 generates an "H" output to the controller 15 and the comparator 27. In addition to the operation result data from the ALU 29, the delimiter D in an instruction information of the memory 11 is supplied to the gate circuit 31. In this case, the gate circuit 31 normally supplies the operation result data from the ALU 29 to the area D of the RAM 18 and supplies the delimiter D thereto in accordance with the selection command from the AND gate AND. The RAM 18 also receives data from the data bus DB1 via the gate 25.

The operation result data from the ALU 29 written in the area D of the RAM 18 is output to the data bus DB2 via the gate circuit 25 and supplied to the processing unit 1. The gate circuit 25 receives an operation command via the control bus CB.

The comparator 27 is used in code comparison. When the comparator 27 receives only an "H" output from the detector 21 or when it receives an "H" output of a borrow from the ALU 29 and an "H" output from the data detector 30, it generates a "small" output representing that first data is smaller than second data. When the comparator 27 receives only the "H" output from the detector 23 or when it receives only the "H" output from the data detector 30, it generates a "large" output representing that the first data is larger than the second data. When the comparator 27 receives the "H" outputs from the detectors 21 and 23 at the same time, it generates a "=" output representing that the first and second data are equal to each other.

Figure 4:
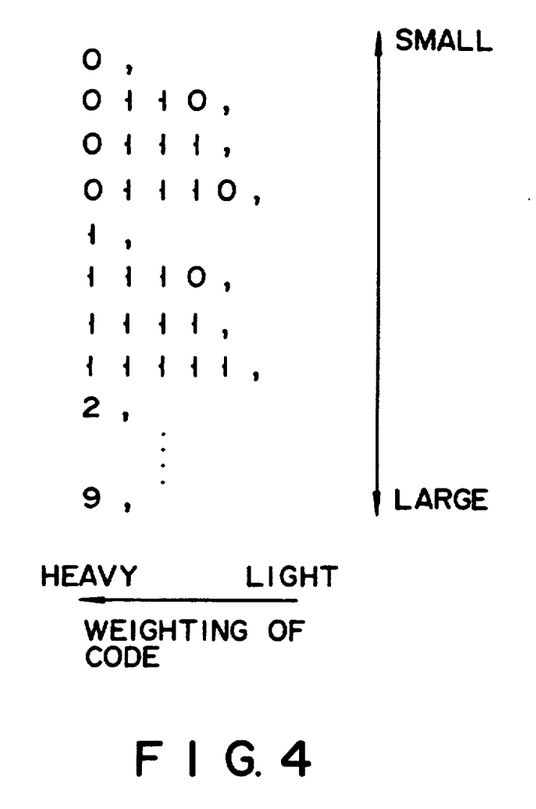
FIG. 4 is a view for explaining a code format used in the embodiment.

A code format used in an operation is as shown in FIG. 4. The size of a code becomes larger from "0" to "9". The weight of a code array is increased as the delimiter code "," representing a word is located closer to a start position of the code array. Each code is represented by a hexadecimal number such that "12" to "15" of hexadecimal numbers are used to represent the word delimiter code ",", the record delimiter code "(", the file delimiter code "§", and the track delimiter code "☒" each representing the delimiter D, respectively.

An operation of the embodiment having the above arrangement will be described below with reference to a flowchart shown in FIG. 5. In step A1, the processing unit 1 sets an instruction information read out from the area I of the RAM 18 into the variable-length processing unit 7. The flow then advances to step A2, and an operation start signal is output from the processing unit 1 to the address counter 12 of the variable-processing unit 7. As a result, an operation of variable-length data based on the instruction information is executed in the unit 7. In step A3, the processing unit 1 monitors whether the operation of the variable-length unit 7 is ended, i.e., whether an operation end signal is output from the variable-length processing unit 7. If NO is determined in step A3 because the operation is not ended, the flow advances to step A4, and the various peripheral units such as the keyboard 2, the CRT 3, the printer 4, the disk 5, the communication unit 6 and the like are controlled on the basis of fixed-length data, as other processing.

As an example of variable-length processing performed by the variable-length processing unit 7, assume that first data ",12" is added to second data ",1" as addition processing. In this case, an instruction information is read out from the instruction memory 11 by the start signal from the processing unit 1 and supplied to the controller 15 via the decoder 14. This instruction information instructs execution of addition processing as the operation code O, and control of the addition processing is instructed to the controller 15. The word delimiter code "," is designated as the delimiter D. In this state, when data concerning the read address RA is supplied to the address controller 17, an address is generated to the RAM 18, and a lower code "2" of the first data is read out and written in the read buffer 20 as a first code.

When data concerning the write address WA is supplied from the instruction memory 11 to the address controller 17, an address is generated to the RAM 18, and a lower code "1" of the second data is read out. These codes are supplied to and added with each other by the ALU 29 via the gate circuits 22 and 24, respectively. An operation result data "3" is supplied to the RAM 18 via the gate circuit 31 and written in the address generated by the data concerning the write address WA in the instruction word.

A second lower code "1" of the first data is read out and written in the read buffer 20. A second lower code of the second data is then read out. This code is the word delimiter code ",". As a result, the word delimiter codes "," are supplied to both of the input terminals A and B of the detector 23, and therefore $B-A \geq 0$ is satisfied. Therefore, the "H" output is generated and latched by the latch 28. An output from the latch 28 is supplied as a disable signal to the gate circuit 24. In this manner, the ALU 29 receives the second lower code "1" of the first data via the gate circuit 22 and a code "0" upon disabling of the gate circuit 24 and adds these codes. An operation result data "1" is written in the RAM 18 via the gate circuit 31.

A third lower code of the first data is read out. This code is the word delimiter code ",". Therefore, the detector 21 receives the word delimiter codes "," at its input terminals A and B, and $B-A \geq 0$ is satisfied. As a result, the "H" output is generated and latched by the latch 26. In this case, the "H" output from the detector 23 is latched by the latch 28, and the "H" outputs from the detectors 21 and 23 are supplied to the first and second input terminals of the AND gate AND. Since the "H" output is supplied to the third input terminal of the AND gate AND via the inverter INV, an "H" output is generated. The "H" output from the AND gate AND is supplied as a selection command to the gate circuit 31. In this manner, the word delimiter code "," of the delimiter D is supplied to the RAM 18 via the gate circuit 31, and an operation result data ",13" is written in the RAM 18. The "H" output from the AND gate AND is supplied to an operation end signal to the controller 15.

As another example of addition processing, addition of first data ",99" with second data ",99" will be described below. When an instruction information is read out from the instruction memory 11, control corresponding to addition processing is instructed to the controller 15 by the operation code O of the instruction information, and the word delimiter code "," is designated as the delimiter D. An address of the RAM 18 is generated by data concerning the read address RA, and a lower code "9" of the first data is read out and written in the read buffer 20 as a first code. Data concerning the write address WR of the instruction memory 11 is supplied to the address controller 17, and a lower code "9" of the second data is read out. These codes are supplied to and added with each other by the ALU 29 via the gate circuits 22 and 24, respectively. Since an operation result data is "18", an "H" output corresponding to a carry and "8" are output. The carry "H" output is supplied to the delay circuit 32, and "8" is supplied to the RAM 18 via the gate circuit 31 and written in the address generated by the data concerning the write address WA of the instruction information.

A second lower code "9" of the first data is read out and written in the read buffer 20. A second lower code "9" of the second data is then read out. These codes are supplied to and added with each other by the ALU 29 via the gate circuits 22 and 24, respectively. In this case, an operation result data is "19" because an output of "1" from the delay circuit 32 is added. Therefore, an "H" output corresponding to a carry and "9" are output. The carry "H" output is supplied to the delay circuit 32, and "9" is supplied to and written in the RAM 18 via the gate circuit 31.

Third lower codes of the first and second data are read out. In this case, both of the codes are the word delimiter codes ",". Therefore, "H" outputs are generated from the detectors 21 and 23 and latched by the latches 26 and 28, respectively. As a result, the gate circuits 22 and 24 are disabled to supply "0"s to the ALU 29. An operation result data of the ALU 29 becomes "1" because only "1" from the delay circuit is added, and this operation result "1" is supplied to and written in the RAM 18 via the gate circuit 31. In this state, the "H" outputs latched by the latches 26 and 28 are supplied to the AND gate AND. While the AND gate AND receives the "H" output via the inverter INV, it generates an output representing an addition processing end. The word delimiter code "," is supplied to and written in the RAM 18 via the gate circuit 31, thereby ending the processing. In this manner, operation result data ",198" obtained by the addition processing is written in the RAM 18.

As an example of variable-length processing, assume that first data "01," is compared with second data "0," as code comparison processing. In this case, an instruction information is read out from the instruction memory 11 by a start command and supplied to the controller 15 via the decoder 14. This instruction information instructs code comparison processing as the operation code O, and control of the comparison processing is instructed to the controller 15. The word delimiter code "," is designated as the delimiter D. In this state, when data concerning the read address AR is supplied to the address controller 17, an address of the RAM 18 is generated, and an upper code "0" of the first data is read out and written in the read buffer 20 as a first code.

Subsequently, data concerning the write address WA of the instruction memory 11 is supplied to the address controller 17. As a result, an upper code "0" of the second data is read out.

These codes are supplied to and compared with each other by the ALU 29 via the gate circuits 22 and 24, respectively. In this case, the ALU 29 performs subtraction between the "0"s of the first and second codes. Since an operation result data of the ALU 29 is "0", the next codes are read out.

That is, a second upper code "1" of the first data is read out and written in the read buffer 20. A second upper code of the second data is then read out. This code is the word delimiter codes ",". Therefore, since the codes "," are supplied to the input terminals A and B of the detector 23 and $B-A \geq 0$ is satisfied, an "H" output is generated. This "H" output is supplied to the comparator 27. Since an output from the detector 21 remains "L" and is supplied to the comparator 27, the comparator 27 generates an output representing that the first data "01" is larger than the second data "0,". This operation result data obtained by the comparison processing is written, through the gate circuit 31, in RAM 18 at address WA output from the instruction memory 11. If the first data is smaller than the second data, the detector 21 outputs an "H" output before the detector 23 produces the "H" output. Therefore, the comparator 27 generates an output representing that the first data is smaller than the second data.

As another example of the comparison processing, comparison between first data "13," and second data "23," will be described below. When an instruction information is read out from the instruction memory 11, control of the comparison processing is instructed to the controller 15 by the operation code O of the instruction information, and the word delimiter code "," is designated as the delimiter D. In this state, an address of the RAM 18 is generated by data concerning the read address RA, and an upper code "1" of the first data is read out and written in the read buffer 20 as a first code. In accordance with the instruction memory 11, an address of the RAM 18 is generated by data concerning the write address WA, and an upper code "2" of the second data is read out. These codes are supplied to and subtracted from each other by the ALU 29 via the gate circuits 22 and 24, respectively. In this case, since the upper code of the second data is "2" compared to the upper code "1" of the first data, an "H" output corresponding to a borrow and "9" are obtained as an operation result data of the ALU 29. The borrow "H" output is supplied to the comparator 27. Upon generation of the "9", the data detector 30 generates an "H" output to the comparator 27. Since neither the detector 21 nor 23 for the word delimiter code "," generates a detection output, an "L" output is supplied to the comparator 27. As a result, the comparator 27 generates an output representing that the first data "12," is smaller than the second data "23,". If the first data is larger than the second data, the ALU 29 does not output a borrow, and an "L" output is supplied to the comparator 27. Therefore, the comparator 27 generates an output representing that the first data is larger than the second data.

As another example of the comparison processing, comparison between first data "12," and second data "12," will be described below. When an instruction information is read out from the instruction memory 11, control of the comparison processing is instructed to the controller 15 by the operation code O of the instruction information, and the word delimiter code "," is designated as the delimiter D. In this state, an address of the RAM 18 is generated by data concerning the read address RA, and an upper code "1" of the first data is read out and written in the read buffer 20 as a first code. An upper code "1" of the second data is then read out. These codes are supplied to and subtracted from each other by the ALU 29 via the gate circuits 22 and 24, respectively. In this case, since the upper codes of the first and second data are both "1"s, an operation result data of the ALU 29 becomes "0", and the next codes are read out. In the same manner as described above, second upper codes of the first and second data are read out. Also in this case, since the readout codes are both "2"s, an operation result data of the ALU 29 becomes "0", and the next codes are read out. That is, third upper codes are read out from the first and second data. In this case, both of the readout codes are the word delimiter codes ",". Therefore, each of the detectors 21 and 23 receives at its input terminals A and B the word delimiter codes "," and generates an "H" output to the comparator 27. The comparator 27 generates an output representing that the first and second data are equal to each other.

As an example of variable-length processing, data transfer processing will be described below. In this case, an instruction information is read out from the instruction memory 11 by an operation start signal and supplied to the controller 15 via the decoder 14. This instruction information instructs transfer processing as the operation code O, and control of the transfer processing is instructed to the controller 15. In addition, the word delimiter code "," for instructing an end of transfer is designated as the delimiter D. In this state, when data concerning the read address RA is supplied to the address controller 17, an address of the RAM 18 is generated, and a first code is read out and temporarily written in the read buffer 20. The first code is then supplied to the RAM 18 via the gate circuit 22, the ALU 29 and the gate circuit 31 and written in an address generated by data concerning the write address WA of the instruction word.

The address stored in the address controller 17 is updated, and the next code is read out. In the same manner as described above, the readout code is supplied to the RAM 18 and written in an address generated by data concerning the write address WA. Similarly, codes are sequentially read out from the RAM 18 and written in addresses of the RAM 18 which are generated by data concerning the write address WA.

Thereafter, the word delimiter code "," is read out and temporarily written in the read buffer 20. The written code is then supplied to the RAM 18 via the gate circuit 22, the ALU 29 and the gate circuit 31 and written in an address generated by data concerning the write address WA of the instruction information. Since the word delimiter code "," is also supplied to the detector 21, the detector 21 generates a detection output, i.e., an end signal to the controller 15. The controller 15 outputs a command for stopping code readout from the RAM 18, thereby ending data transfer.

When the controller 15 receives the end signal of the variable-length operation, the controller 15 outputs an operation end signal to the processing unit 1.

Figure 5:
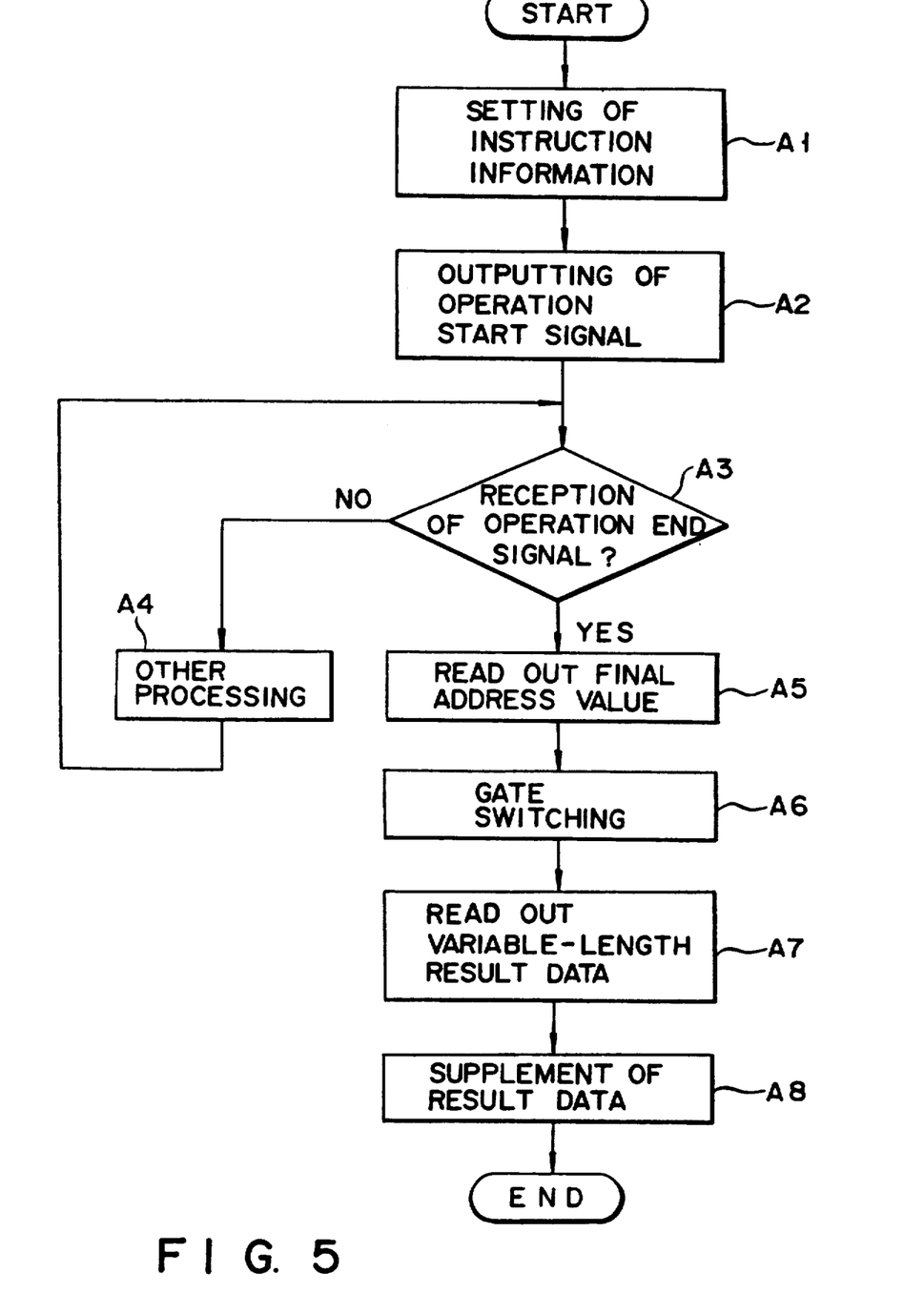
FIG. 5 is a flowchart for explaining the embodiment.

When the processing unit 1 receives the operation end signal, it determines YES in step A3 of FIG. 5, and the flow advances to step A5. In step A5, a final address value of the address controller 17 is read out. In this case, the address of the word delimiter code "," written in the RAM 18 as the last data in the above addition processing is read out as the final address value and fetched in the processing unit 1 via the data bus DB2. In step A6, an operation signal representing gate switching is supplied to the gate circuit 25 via the control bus CB, thereby connecting the data bus DB2 to the RAM 18 via the gate circuit 25.

In step A7, the operation result data, i.e., the variable-processing result data written in the RAM 18 is read out. In this case, on the basis of the write address WR in the instruction information of the instruction memory 11 and the final address value fetched in step A5, the operation result data of the above addition processing is read out from the RAM 18 and supplied to the processing unit 1 via the gate circuit 25 and the data bus DB2. In step A8, the operation result data is supplied to the peripheral units such as the CRT 3, the printer 4, the disk 5 and the communication unit 6.

The present invention is not limited to the above embodiment but can be modified without departing from the spirit and scope of the invention. For example, in the above embodiment, when the processing unit 1 is to read out the processing result data from the variable-length processing unit 7, the final address is fetched from the address controller 17. By checking a delimiter code of data at the processing unit 1 side, however, data equivalent to the final address from the address controller 17 may be obtained. In addition, priorities may be given to the processing unit 1 and the variable-length processing unit 7, so that interruption processing can be performed by a unit of a higher priority even during accessing of the main memory unit 8 by a unit of a lower priority.

What is claimed is;

1. A data processing apparatus comprising:
   data storage means for storing variable-length data delimited by a delimiter code;
   variable-length processing means including:
      an instruction memory;
      a first gate circuit for receiving first data read out from said data storage means;
      a first detector for detecting a delimiter code in said first data and for outputting a disable signal to said first gate circuit for inhibiting said first data from being output after detecting said delimiter code;
      a second gate circuit for receiving second data read out from said data storage means;
      a second detector for detecting a delimiter code in said second data and for outputting a disable signal to said second gate circuit for inhibiting said second data from being output after detecting said delimiter code;
      an arithmetic logic unit for receiving at least one of said first and second data respectively from said first and second gate circuits; and
      control means for executing by said arithmetic logic unit an operation instructed by instruction information stored in said instruction memory on variable length data read out from said data storage means, and for outputting by said control means an operation end signal after said operation is ended; and
   processing means for outputting an operation start signal for starting said operation of said variable-length processing means, and for supplying said executed result data to a peripheral unit after receiving said operation end signal from said control means of said variable-length processing means.

2. A data processing apparatus according to claim 1, wherein:
   said data storage means includes means for storing the instruction information; and
   said processing means includes means for setting the instruction information, which is read out from said means for storing the instruction information, in said instruction memory of said variable-length processing means; and means for outputting the operation start signal after said setting of the instruction information.

3. A data processing apparatus according to claim 1, wherein said variable-length processing means further includes means for writing said executed result data in said data storage means designated by address and for thereafter outputting said operation end signal.

4. A data processing apparatus comprising:
   data storage means for storing variable-length data delimited by a delimiter code;
   variable-length processing means, including:
      an instruction memory;
      a first gate circuit for receiving first data read out from said data storage means;
      a first detector for detecting a delimiter code in said first data;
      a second gate circuit for receiving second data read out from said data storage means;
      a second detector for detecting a delimiter code in said second data;
      an arithmetic logic unit for receiving at least one of said first and second data respectively from at least one of said first and second gate circuits;
      a data detector for detecting the presence and absence of output data output from said arithmetic logic unit;
      a comparator for detecting the presence and absence of a borrow signal output from said arithmetic logic unit and of each signal from said data detector and from each of said first and second detectors, the comparator outputting a signal indicating large and small values of the first and second data; and
      control means for executing by said arithmetic logic unit an operation instructed by instruction information stored in said instruction memory on variable-length data read out from said data storage means, and for outputting by said control means an operation end signal after said operation is ended; and
   processing means for outputting an operation start signal for starting said operation to said variable-length processing means, and for supplying said executed result data to a peripheral unit after receiving said operation end signal from said control means of said variable-length processing means.

5. A data processing apparatus according to claim 4, wherein said comparator further includes:
   means for outputting a signal representing that the first data is smaller than the second data, when said comparator receives a signal from said first detector or receives a borrow signal and a signal from said data detector;
   means for outputting a signal representing that the first data is larger than the second data, when said comparator receives a signal from said second detector or receives a signal from said data detector; and
   means for outputting a signal representing that the first and second data are equal to each other, when said comparator simultaneously receives detection signals from said first and second detectors.

6. A data processing apparatus comprising:
   data storage means for storing variable-length data delimited by delimiter codes of different types;
   variable-length processing means, including:
      instruction memory means for storing the types of the delimiter codes;
      a gate circuit, including a read buffer, for receiving data read out from said data storage means;
      detecting means for detecting a delimiter code in said read buffer; and
   control means including executing means for starting executing of an operation of data transfer on variable-length data read out from said data storage means, and wherein said executing means ceases a data transfer operation when a type of the delimiter code detected from said read-out data by said detecting means coincides with one of the types of delimiter codes stored in said instruction memory means; and means for outputting a data transfer end signal after said operation is ended; and
   means for outputting a data transfer start signal for starting said operation of data transfer to said variable-length processing means, and for supplying said executed result data to a peripheral unit after receiving said data transfer end signal from said control means of said variable-length processing means.

7. A data processing apparatus, comprising:
(1) data storage means for storing first and second variable-length data delimited by delimiter codes;
(2) variable-length processing means, including:
an instruction memory;
decoding means for decoding an instruction information read out from said instruction memory;
a first detector for detecting the delimiter code in first variable-length data read out from said storage means;
a second detector for detecting the delimiter code in second variable-length data read out from said storage means;
control means for starting executing of an operation decoded by said decoding means, on said first and second variable-length data specified by detection of delimiter codes by said first and second detectors; and
means for writing executed result data into said data storage means, and said control means including means for thereafter outputting an operation end signal; and
(3) means for outputting an operation start signal for starting said operation, to said variable-length processing means, and for supplying said result data in said data storage means to a peripheral unit after receiving said operation end signal from said control means of said variable-length processing means.

8. A data processing apparatus according to claim 7, wherein:
said instruction memory includes a delimiter portion for designating a delimiter; and
said detecting means and control means includes means for executing said operation until the delimiter delimiting the read variable-length data detected by said detecting means, coincides with the delimiter designated by an instruction stored in said instruction memory.

* * * * *

UNITED STATES PATENT AND TRADEMARK OFFICE
CERTIFICATE OF CORRECTION

PATENT NO. : 5,214,764

DATED : May 25, 1993

INVENTOR(S) : KOMURA, Junichi et al

It is certified that error appears in the above-identified patent and that said Letters Patent is hereby corrected as shown below:

Title page, item [56] References Cited,
Under "U.S. PATENT DOCUMENTS"

Add --4,831,543  5/1989  Mastellone--.

Signed and Sealed this

Eighth Day of November, 1994

Attest:

BRUCE LEHMAN

*Attesting Officer*   *Commissioner of Patents and Trademarks*